(12) United States Patent
Chung et al.

(10) Patent No.: US 9,710,280 B2
(45) Date of Patent: Jul. 18, 2017

(54) OVERLAPPING ATOMIC REGIONS IN A PROCESSOR

(75) Inventors: Jaewoong Chung, Bellevue, WA (US); Cheng Wang, San Ramon, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 859 days.

(21) Appl. No.: 13/993,364

(22) PCT Filed: Dec. 30, 2011

(86) PCT No.: PCT/US2011/068013
§ 371 (c)(1),
(2), (4) Date: Jun. 12, 2013

(87) PCT Pub. No.: WO2013/101144
PCT Pub. Date: Jul. 4, 2013

(65) Prior Publication Data
US 2014/0122845 A1    May 1, 2014

(51) Int. Cl.
*G06F 9/30* (2006.01)
*G06F 9/38* (2006.01)
*G06F 9/46* (2006.01)
*G06F 9/52* (2006.01)

(52) U.S. Cl.
CPC ........ *G06F 9/3861* (2013.01); *G06F 9/30116* (2013.01); *G06F 9/3842* (2013.01); *G06F 9/467* (2013.01); *G06F 9/528* (2013.01)

(58) Field of Classification Search
CPC ....... G06F 9/467; G06F 9/528; G06F 9/30116
See application file for complete search history.

(56) References Cited

U.S. PATENT DOCUMENTS

| 7,350,034 B2* | 3/2008 | Shen | G06F 12/0833 711/145 |
| 9,292,221 B2* | 3/2016 | Wang | G06F 9/30116 |
| 2005/0177703 A1* | 8/2005 | Norden | G06F 9/3802 712/205 |

(Continued)

FOREIGN PATENT DOCUMENTS

CN    102103485    6/2011

OTHER PUBLICATIONS

McDonald et. al., "Characterization of TCC on Chip-Multiprocessors", 14th International Conference on Parallel Architectures and Compilation Techniques, Sep. 2005. PACT 2005, pp. 63-74.*

(Continued)

*Primary Examiner* — Yuqing Xiao
(74) *Attorney, Agent, or Firm* — Trop, Pruner & Hu, P.C.

(57) ABSTRACT

In one embodiment, the present invention includes a processor having a core to execute instructions. This core can include various structures and logic that enable instructions of different atomic regions to be executed in an overlapping manner. To this end, the core can include a register file having registers to store data for use in execution of the instructions, and multiple shadow register files each to store a register checkpoint on initiation of a given atomic region. In this way, overlapping execution of atomic regions identified by a programmer or compiler can occur. Other embodiments are described and claimed.

20 Claims, 11 Drawing Sheets

(56) References Cited

U.S. PATENT DOCUMENTS

| | | | |
|---|---|---|---|
| 2007/0260942 A1* | 11/2007 | Rajwar | G06F 9/526 714/54 |
| 2008/0016325 A1 | 1/2008 | Laudon et al. | |
| 2008/0162990 A1* | 7/2008 | Wang | G06F 9/3863 714/19 |
| 2008/0177959 A1* | 7/2008 | Moir | G06F 9/466 711/161 |
| 2009/0217020 A1 | 8/2009 | Yourst et al. | |
| 2011/0202729 A1 | 8/2011 | Bohizic et al. | |

OTHER PUBLICATIONS

Herlihy et. al., "Transactional Memory: Architectural Support for Lock-Free Data Structures", In Proceedings of the 20th International Symposium on Computer Architecture, pp. 289-300, 1993.*
Taiwan Patent Office, Office Action Mailed Sep. 25, 2014, in Taiwan Application No. 101150121. (Redacted).
Austen McDonald, et al., "Architectural Semantics for Practical Transactional Memory," 2006, pp. 1-12.
Haitham Akkary, et al., "Checkpoint Processing and Recovery: Towards Scalable Large Instruction Window Processors," 2003, pp. 1-12.
Naveen Neelakantam, et al., "Hardware Atomicity for Reliable Software Speculation," 2007, pp. 1-12.
Matt T. Yourst, et al., "Incremental Commit Groups for Non-Atomic Trace Processing," Sep. 23, 2009, pp. 1-12.
Edson Bonn, et al., "LAR-CC: Large Atomic Regions with Conditional Commits," 2011, pp. 1-10.
Glenn Hinton, et al., "The Microarchitecture of the Pentium 4 Processor," Intel Technology Journal Q1, 2001, pp. 1-13.
D.L. Weaver, et al., "The SPARC Architecture Manual (Version 9)," 1994, 399 pages.
James C. Dehnert, et al., "The Transmeta Code Morphing Software: Using Speculation, Recovery and Adaptive Retranslation to address Real-life Challenges," 2003, pp. 1-10.
S.V. Adve, et al., "Weak Ordering—a new definition," 1990, pp. 1-13.
International Searching Authority, "Notification of Transmittal of the International Search Report and the Written Opinion of the International Searching Authority," mailed Jun. 19, 2012, in International application No. PCT/US2011/068013. 9 pages.
Taiwan Intellectual Property Office, Office Action mailed Nov. 24, 2015 in Taiwan Patent Application No. 103145803, 10 pages.
Taiwan Intellectual Property Office, Office Action mailed Dec. 12, 2016 in Taiwan Patent Application No. 105113272. (Translation Redacted).

* cited by examiner

Begin_region [0]
....
Load [0]
....
Store [0]
....
End_region [0]
Begin_region [0]
....
Load [0]

(a) Original Code

Begin_region [0]
....
Load [0]
....
Begin_region [1]
....
Load [1]
....
Store [0]
....
End_region [0]

(b) After Software Scheduling

FIG. 9

OVERLAPPING ATOMIC REGIONS IN A PROCESSOR

BACKGROUND

Computer systems execute instructions of various code. Oftentimes, the code is not designed for a particular processor, and its performance on a given platform can suffer. Effective compiler optimizations can improve performance and reduce power consumption. There have been decades of work to develop optimization techniques such as partial redundancy elimination (e.g., eliminating redundant operations), load hoisting (e.g., scheduling loads early in the execution flow), and so on. Unfortunately, these techniques, effective in principle, are often not easy to adopt or can be applied only with a limited optimization scope. Complex control flows found frequently in many integer and enterprise applications demand sophisticated recovery code in case speculative compiler optimizations fail. Complicated memory models of modern processors hinder the compiler from rescheduling memory operations aggressively for multi-threaded programs.

Architectural support for atomic execution helps mitigate the complexity of implementing speculative compiler optimizations. A hardware primitive for atomic execution allows a group of instructions to be enclosed within a region and executed atomically (namely all or none of the instructions are executed) and in an isolated manner (in that no intermediate results of region are exposed to the rest of the system). Using the primitive, the compiler can avoid generating complex compensation code for speculative optimizations by simply undoing the failed speculative execution of the region and restarting it without speculation. The atomic execution of memory operations in the region allows the compiler to reorder the operations aggressively within the region.

While eliminating much of the compiler's burden to implement speculative optimizations, existing hardware designs for atomic execution impose unnecessarily strict memory ordering constraints on underlying hardware platforms for relaxed memory models such as weak consistency and total store ordering (TSO). In the course of atomically executing memory operations in an atomic region, the boundary of the region behaves as a memory fence to make the memory operations visible to the rest of the system when the region commits. These memory fences restrict memory operations from being executed out of the program order beyond region boundaries, even when atomic regions are used to optimize a part of a code segment where memory operations can be executed out of order in a relaxed memory model (e.g., optimizing the code along a hot path for a single-threaded application whose memory does not access synchronization variables and therefore can be executed out of order weak consistency). Moreover, applied to multi-threaded applications, atomic regions restrict reordering of memory operations among different atomic regions as well. They are executed on a serializable schedule (that is, the effect of their execution has to be as if they are executed one by one). As a result, memory operations have to be totally ordered (such that all processors agree their global order of execution). Accordingly performance optimizations are limited.

BRIEF DESCRIPTION OF THE DRAWINGS

FIG. 9 is an illustration of original code and the same code after software scheduling in accordance with an embodiment of the present invention.

DETAILED DESCRIPTION

Figure 1:
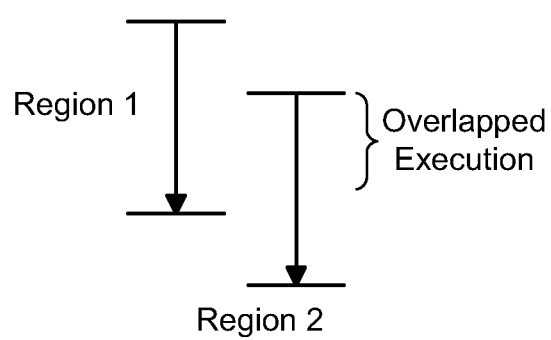
FIG. 1 is a graphical illustration of overlapping atomic memory regions in accordance with one embodiment of the present invention.

In various embodiments, different code regions, more specifically different atomic regions (as defined by software (either as written or by compilation)), can be allowed to execute in at least a partially overlapping manner. This overlapping of atomic regions is referred to herein as an overlapping atomic region (OAR). In this way, unnecessary memory ordering constraints of atomic region hardware designs can be relaxed. Embodiments thus enable atomic regions from the same thread to be executed in a partially overlapped manner, as shown in FIG. 1. As seen, execution of code of Region2 is allowed to overlap with execution of code of Region1. In this way, memory operations of younger atomic regions in the program order may be reordered with those of older atomic regions. For ease of discussion, overlapping of two atomic regions is described. However, those of skill in the art understand that embodiments are not limited in this regard, and it is possible for greater than two atomic regions to overlap.

According to various embodiments, there are two types of OARs depending on which memory operations are to be reordered. A first type of OAR, referred to herein as OAR-SL, allows both stores and loads from the younger atomic region to be reordered with those of the older atomic region. This type of overlapping execution may be useful for weak consistency that allows both stores and loads to be reordered absent synchronization accesses. A second type of OAR, referred to herein as OAR-L, allows only loads from the younger atomic region to be reordered. This type of overlapping execution may be sufficient for a relaxed memory model that totally orders stores (e.g., SPARC™ processors and x86 processors) since stores cannot be reordered regardless of region boundaries.

Embodiments may provide extended state information in a private cache of a processor such that atomic regions can use the private cache as a speculative buffer. This allows long-lived atomic regions to be overlapped and enables a wider scope of compiler optimizations. Note that in various embodiments, atomic regions to be overlapped can be on the order of 10,000 or more instructions. As such the size of an atomic region is not limited to internal pipeline structures of a processor. By leveraging a cache coherence protocol for conflicts among atomic regions, overlapping atomic execution may be supported in the context of multicore processors. Further as described below, embodiments can be used to support both in-order processors and out-of-order processors.

Figure 2:
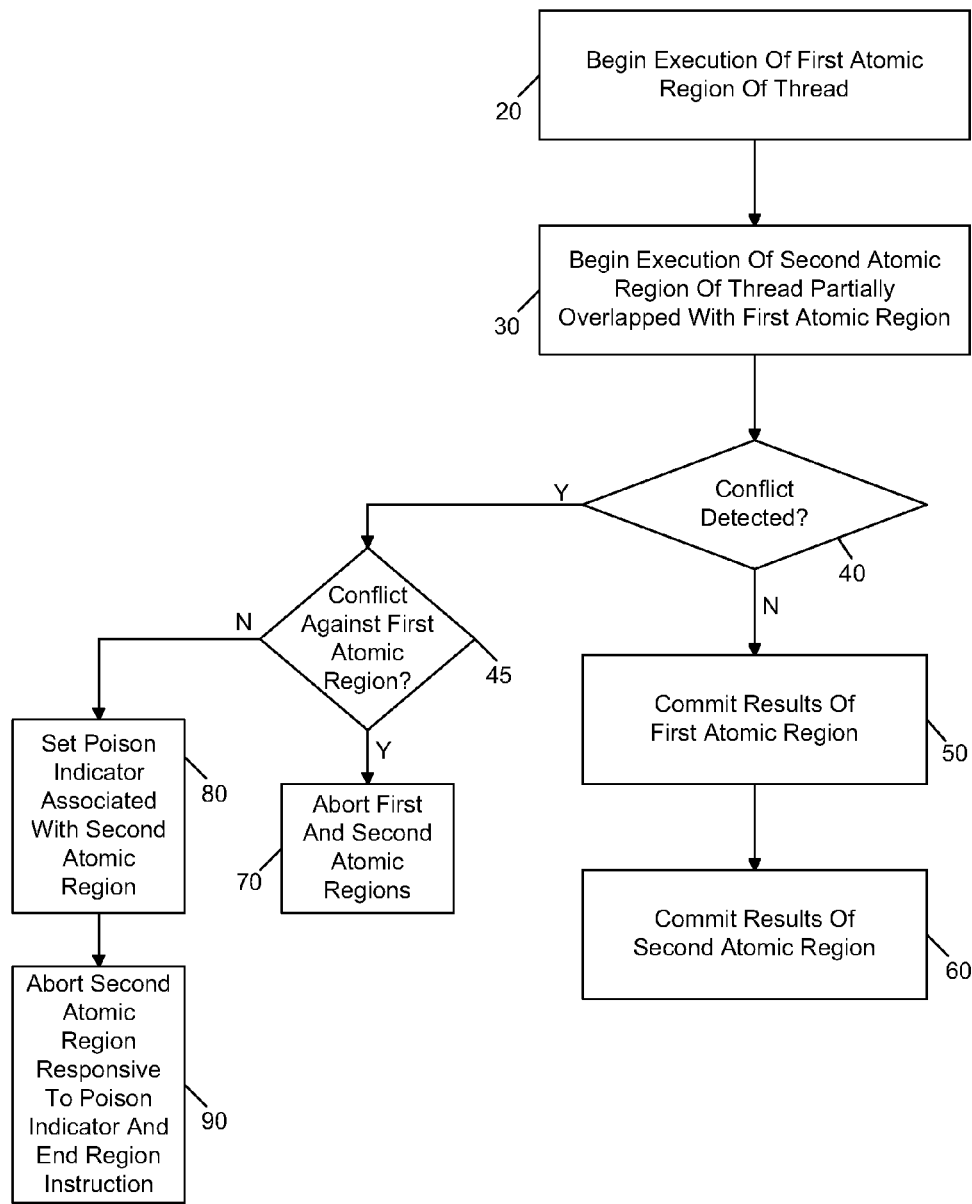
FIG. 2 is a flow diagram of a high level overview of overlapping atomic region execution in accordance with an embodiment of the present invention.

Referring now to FIG. 2, shown is a flow diagram of a high level overview of overlapping atomic region execution in accordance with an embodiment of the present invention. As shown in FIG. 2, method 10 may be implemented in a processor such as a multicore processor in which atomic regions can execute in at least a partially overlapping manner. In the embodiment of FIG. 2, method 10 may begin by beginning execution of a first atomic region of a thread (block 20). Note that as used herein the term "atomic region" refers to a collection of instructions identified by software to be executed without interruption by other instructions outside of the collection. Thereafter, at block 30 execution of the second atomic region can begin that is at least partially overlapped with the first atomic region. As discussed further herein, when each of these regions begins execution, a last region identifier (LRID) value can be set based on the indicated region and tagged to the instructions of that region. Furthermore, at each beginning of execution of an atomic region, an atomic region counter (ARC) register value can be updated, e.g., incremented. Furthermore, during execution of instructions of these atomic regions, various speculative fields present in a private cache of the processor can be updated accordingly.

Thus during execution of instructions of one or the other of the atomic regions, it can be determined whether a conflict is detected (diamond 40). In one embodiment, this determination of conflict can be based on receipt of a given cache coherency message for a cache line for which one or more of the various speculative indicators of the speculative fields has been set, thus indicating that the thread has been accessed during execution of the given atomic region.

As seen in FIG. 2, if a conflict is detected, control passes to diamond 45 where it can be determined which atomic region this conflict is against. If the conflict is against the first region, control passes to block 70 where the atomic regions can be aborted. Various operations in connection with the aborting these regions, including roll back, clearing of certain state information and so forth can be performed, as will be discussed further below. If instead the conflict is against the second region, control passes to block 80, where a poison indicator associated with the second atomic region may be set to indicate that it is doomed to fail. Note that this region may continue to execute, and responsive to this set poison indicator and its end region instruction, the atomic region will abort (block 90).

Otherwise if no conflict is detected, control passes from diamond 40 to block 50 where the results of the first atomic region can be committed. Then when the second atomic region completes, its results may also be committed (block 60). Although shown at this high level in the embodiment of FIG. 2, understand that various operations are involved in the high level actions shown in FIG. 2, as will be described further below.

In various embodiments, a so-called poison indicator may be used to manage a doomed younger atomic region, enabling simplified hardware to deal with the correct overlapped execution of a live atomic region and a to-be-aborted atomic region. Furthermore, gradual register checkpoints may be implemented for a younger atomic region, which allows the younger atomic region to start executing while the older atomic region's arithmetic logic unit (ALU)/load operations have not been executed yet.

Figure 3:
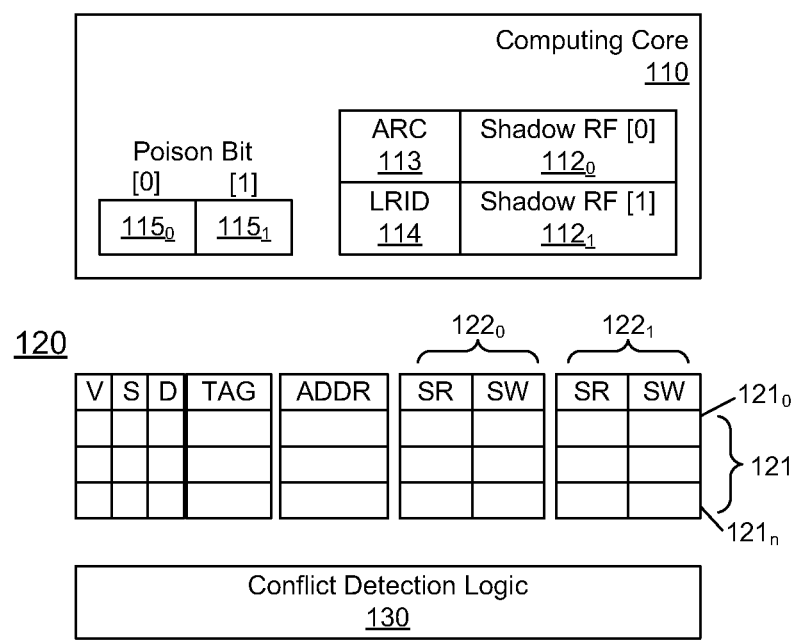
FIG. 3 is a block diagram of a processor in accordance with an embodiment of the present invention.

Referring now to FIG. 3, shown is a block diagram of a processor in accordance with an embodiment of the present invention. As shown in FIG. 3, processor 100 may be a high-level view of a portion of a multicore processor. Specifically seen in the embodiment of FIG. 3 is a core 110. Understand that while a given core can include various components and logic such as one or more front end units, execution units, back end units and so forth, the core is shown at a high level to show those structures used in connection with overlapping atomic region execution in accordance with an embodiment of the present invention. As shown in FIG. 3, core 110 includes a pair of shadow register files $112_0$ and $112_1$, each of which is associated with an atomic region. Understand that these shadow register files may be separate from one or more conventional register files such as general-purpose register files, which may be of integer, floating point, vector or other format.

In addition, core 110 includes an atomic region counter (ARC) register 113 which is configured to store a count of overlapping atomic regions that have begun execution but have not yet committed. As also seen, a LRID storage 114 may be present to store an indicator of the currently executing atomic region. As further seen, poison indicators can be stored in a poison storage $115_0$-$115_1$, each of which may be a single bit to indicate when a given atomic region is doomed to fail.

To provide for storage of speculative data during execution of atomic regions, a private cache 120, which in various embodiments may be one or more levels of a private cache structure, may be used as a speculative buffer to store values accessed and modified during execution of atomic regions. As seen, cache 120 can include a plurality of entries $121_0$-$121_n$. Each entry or cache line can include various information including state data such as cache coherency state information (e.g., valid bits, shared bits, dirty bits, and so forth), tag information, and address information. Furthermore, each cache line can be configured to include speculative fields in accordance with an embodiment of the present invention. As shown in the embodiment of FIG. 3, each cache line can include a first speculative field $122_0$ associated with a first atomic region and a second speculative field $122_1$ associated with another atomic region.

In the embodiment of FIG. 3, four bits per cache line may be provided to track speculative addresses read or written by each atomic region. A first status indicator for a speculative read, referred to as a SR bit is set for a speculative read, namely a read by an atomic region that has not committed to the machine state of the processor (by a correct retirement of the region). A second status indicator for a speculative write, referred to as a SW bit is set for a speculative write, namely a write by an atomic region prior to commitment. Speculative data are thus buffered in the private cache until the atomic region commits. Note that while two structures are shown to provide information for two overlapping regions, understand the scope of the present invention is not limited in this regard and in other embodiments it is possible for more than two overlapping regions to execute and the processor can be configured to provide for additional structures for these additional atomic regions such as additional shadow register files, poison indicators and speculative fields.

As further seen in FIG. 3, a conflict detection logic 130 can further be present and used to identify conflicts, e.g., based on cache coherency protocol information. Thus in various embodiments, conflict detection logic 130 can be implemented via a cache controller associated with private cache 120. Although shown with this particular implementation in the embodiment of FIG. 3, understand the scope of the present invention is not limited in this regard.

Further state information provided in an embodiment of the present invention includes a so-called last region identifier (LRID), which can be stored in LRID register 114, and this value may be automatically tagged to the instructions belonging to a region. In this way, there is no change to an existing ISA to burden a compiler to tag the region information in the binary code.

A begin_region instruction is used to start an atomic region and an end_region instruction is used to commit the atomic region. The begin_region takes an alternative program counter to jump to when the atomic region is aborted. ARC register 113 counts the number of outstanding atomic regions and prevents a new atomic region from being executed if the value hits the hardwired maximum value. In one embodiment, the maximum value of ARC register 113 is set to two to support two outstanding atomic regions. Shadow register files $110_0$ and $110_1$ may be used to take a register checkpoint when an atomic region starts.

LRID register 114 is an index register to indicate which speculative field is occupied by the latest atomic region. It is initialized to zero and toggles when a begin_region instruction is dispatched to the first execution stage for in-order processors and when the instruction enters the instruction window for out-of-order processors. The values toggle back when the next atomic region starts. This way, the value is always tagged in the program order.

Instructions following the begin_region instruction are tagged with the LRID value to indicate which region the instructions belong to and which hardware resources to use for speculative execution. For example, if the tagged value of a memory operation is 0, the operation uses the SR[0] bit and the SW[0] bit of speculative field $122_0$. An end_region instruction is also tagged with the LRID value so that an atomic region knows which pair of bits in the speculative fields to manipulate when it commits.

A conflict between atomic regions is detected with cache coherence logic (which can be implemented in conflict detection logic 130) checking if an invalidation message hits a cache line with the SR bit or the SW bit, or a data-sharing message hits a cache line with the SW bit. Without a conflict, an atomic region commits by discarding the register checkpoint and gang-clearing the SR bits and the SW bits of its speculative field only. Detecting conflict, the atomic region is rolled back by invalidating the cache lines with a set SW bit, restoring the register checkpoint to the core's register file (not shown for ease of illustration in FIG. 3), and gang-clearing the SR bits and the SW bits, and reporting the index of the conflicted SR/SW bit pair (i.e., 0 or 1). For simplicity, an atomic region may also be aborted by system-level events such as page faults, interrupts, and context switches. A capacity overflow also aborts an atomic region.

For the sake of design simplicity, only the older atomic region is aborted (together with the younger atomic region if it exists) so that a complicated case where the younger atomic region is aborted while the old atomic region proceeds can be avoided. This implies that if only the younger atomic region is conflicted, it has to wait until the older one commits. To remember that an atomic region is doomed to be aborted, the poison bits of registers $115_0$ and $115_1$ may be used. The index of the conflicted SR/SW bit pair is used to set a poison bit for a doomed atomic region. When an atomic region commits with an end_region instruction, it checks its poison bit to see if it is doomed. If it is, it clears the bit and aborts itself. The bit is also cleared when the older atomic region is aborted.

As multiple outstanding atomic regions can exist, a core may need to deal with multiple data versions for the same memory location. For example, assume two overlapping atomic regions. In this case there may be three data versions for a given memory location: the last committed version, a speculative version for the older atomic region, and another speculative version for the younger atomic region. If the older atomic region is about to modify a dirty cache line containing the last committed version, the cache line is first flushed out of the speculative cache (namely a private cache hierarchy of the core) to keep the last committed version safe in the non-speculative part of the memory hierarchy. This flush can thus provide the committed version to a shared cache memory such as a last level cache.

It can be assumed that the processor serializes memory accesses to the same cache line so that the second speculative version is created by the younger atomic region only after all memory operations of the old atomic region to the cache line have completed. As such, the first memory operation of the younger atomic region to the cache line, regardless of a load or a store, may cause a copy or clone of the cache line with the first speculative version with the SR/SW bits cleared, which can be inserted into the speculative cache. Then, the SR/SW bit pair indexed by the LRID value tagged to the memory operation are updated accordingly. From this point on, all memory operations of the younger atomic region go to this cloned cache line by checking if the address tag of the cache line matches and if either of the SR/SW bits indexed by their tagged LRID value is set. If the older atomic region has not accessed the cache line before, there is no need to clone the cache line for the younger atomic region.

To support a register checkpoint for the younger atomic region, multiple shadow register files 110 can be used, namely a shadow register file associated with each overlapping atomic region. The shadow register file to use is indexed by the LRID value tagged to the begin_region instruction of the younger atomic region. Since the younger atomic region can start being executed before all instructions of the older atomic region retire, the register checkpoint taken by the instruction may be updated with possible register value changes by the outstanding instructions of the older atomic region.

In one embodiment, the register checkpoint can be updated whenever an outstanding instruction of the older atomic region modifies a register value. The checkpoint update is done by: 1) checking if the ARC register value is two to confirm the existence of the younger atomic region, and if so; 2) comparing the current LRID register value and the LRID values tagged to instructions to identify those from the older atomic region; and 3) updating the shadow register file for the younger atomic region whose index is obtained by toggling the LRID value tagged to the instructions.

To ensure that atomic regions from the same thread are committed in program order, it can be determined at an issue stage, and prior to issuance of an end_region instruction whether: 1) the ARC register value is two (i.e., two outstanding atomic regions exist); and 2) the LRID register value equals the LRID value tagged to the instruction (i.e., this atomic region is the younger one). If both conditions are met, the end_region instruction is not scheduled until the ARC register value is updated to one (i.e., the older atomic region has been committed).

Figure 4:
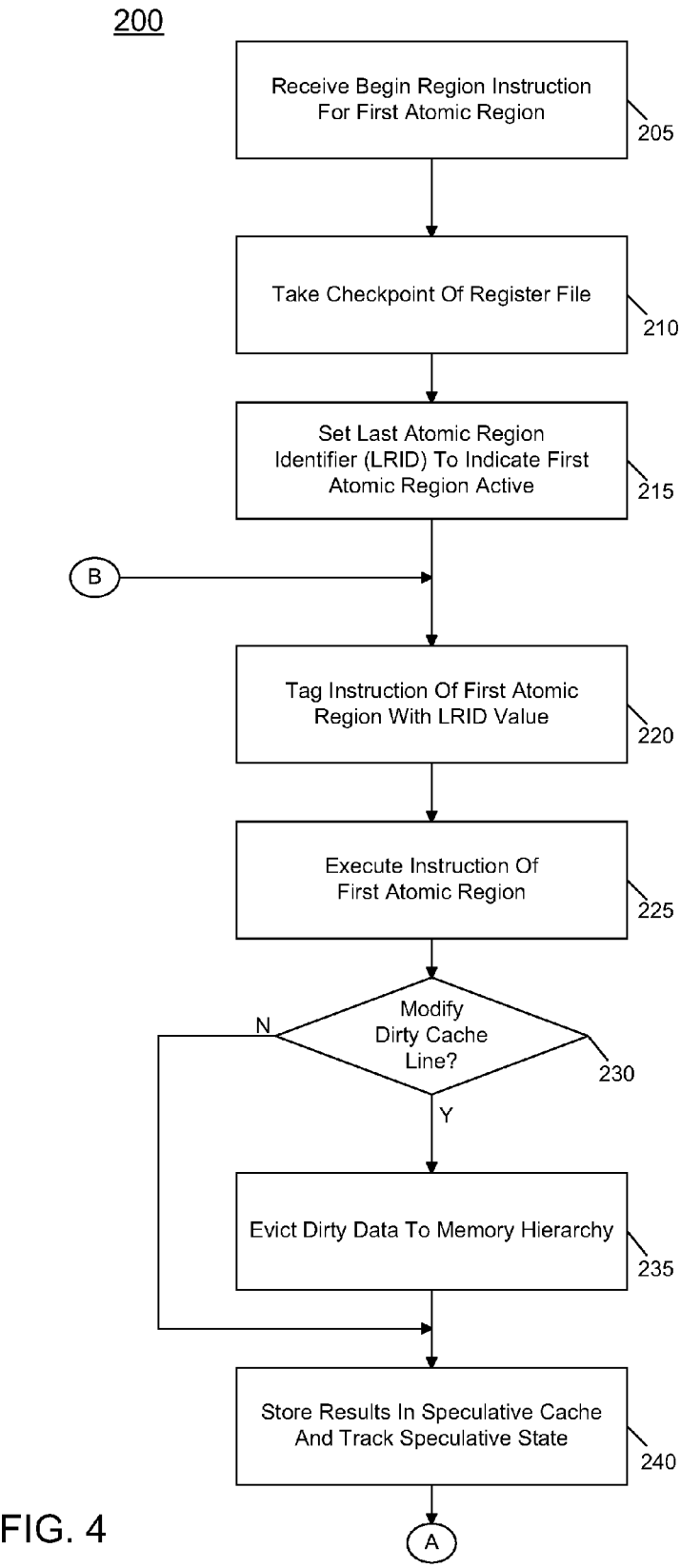
FIG. 4 is a flow diagram of details involved in performing overlapping atomic region execution in accordance with an embodiment of the present invention.

Referring now to FIG. 4, shown is a flow diagram of details involved in performing overlapping atomic region execution in accordance with an embodiment of the present invention. As shown in FIG. 4, method 200 may begin by receiving a begin region instruction for a first atomic region (block 205). Responsive to receipt of this instruction, a checkpoint of the current state of the one or more register files of the core can be taken and stored, e.g., in a checkpoint register file associated with the atomic region. Furthermore, at block 215 the LRID can be set to indicate that the first atomic region is active.

Accordingly, at this point control passes to block 220 where instructions may begin to be issued within this first atomic region. These instructions can be tagged with the LRID value for this first atomic region. Accordingly, at block 225 a given instruction can be executed. Next it can be determined whether this instruction causes a modification to a dirty cache line, namely a cache line within the private cache that has previously been modified, but not written back to a system memory (diamond 230). If so, control passes to block 235 where the dirty data can be evicted to the memory hierarchy. For example, the evicted data can be sent to a last level cache where it can be stored there to thus maintain the updated information so that this data is not lost in case of an abort to the atomic region. Control next passes to block 240 where the result can be stored in the speculative cache and speculative state associated with the results can be updated. More specifically as described above, the data can be written to the identified cache line that was previously evicted and the speculative state, e.g., a speculative write indicator for the first atomic region can be set within the cache line.

Figure 5:
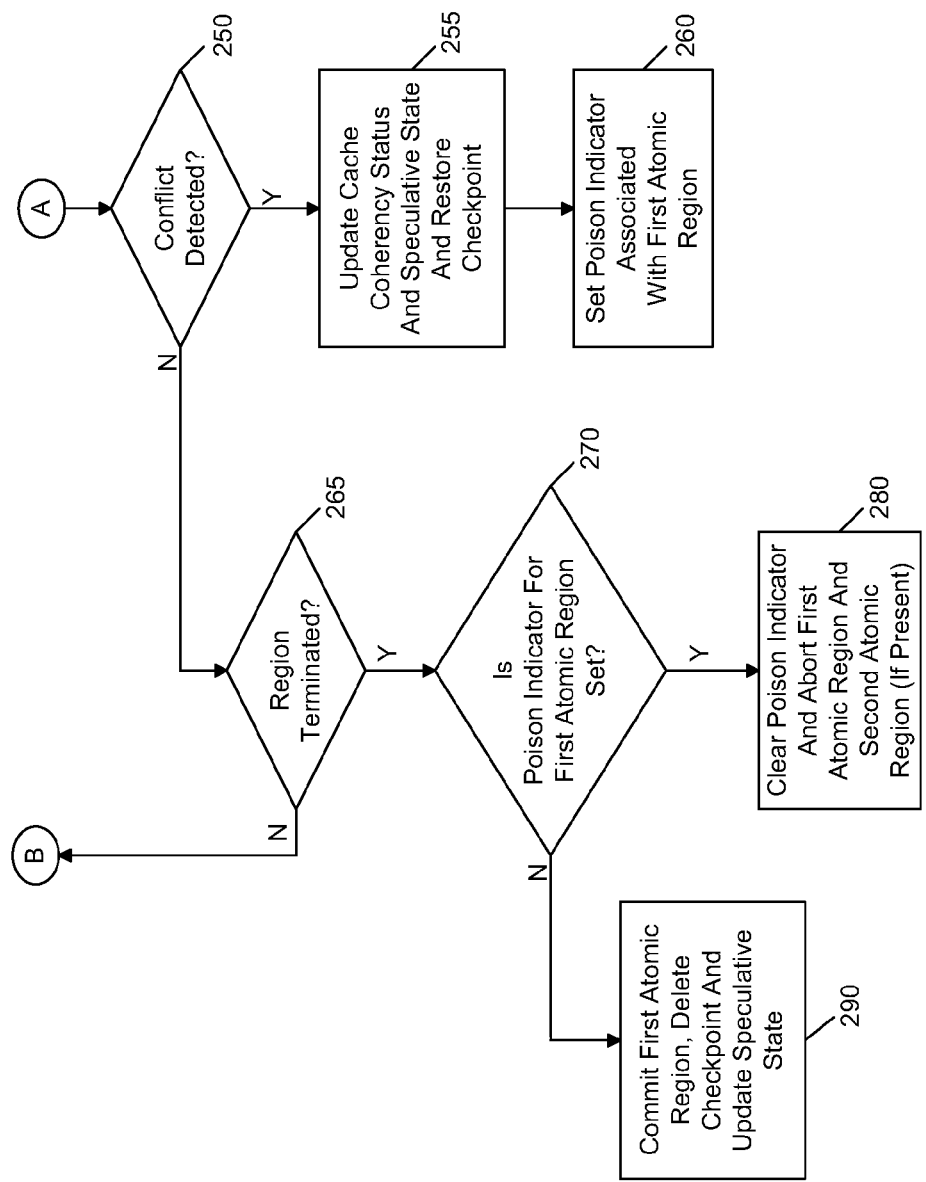
FIG. 5 is a flow diagram of further details involved in performing overlapping atomic region execution in accordance with an embodiment of the present invention.

As seen, control next passes to diamond 250 present in FIG. 5. There it can be determined whether a conflict is detected. If not, it can be determined whether the atomic region has terminated (diamond 265). If not, control passes to block 220 above for issuance of a next instruction of the region.

If instead at diamond 250 it is determined that a conflict is detected, control passes to block 255 where the cache coherency status can be updated along with the speculative state and furthermore, the checkpoint can be restored. That is, the checkpoint register file values can be written back to the registers to place the state back to as it was at the beginning of the atomic region and furthermore, the speculative state for this atomic region, namely the speculative field of the private cache can be updated, e.g., all cleared. Furthermore, control passes to block 260 where the poison indicator associated with this first atomic region can be set.

Referring still to FIG. 5, if at diamond 265 it is determined that termination of the region has occurred, e.g., via an end region instruction, control passes to diamond 270 where it can be determined whether the poison indicator is set for this region. If so, the indicator is cleared and the one or more atomic regions can be aborted (block 280). Otherwise if the indicator is not set, control passes to block 290 where the atomic region can commit and accordingly the values stored in the checkpoint register file can be deleted and the speculative state updated, e.g., all cleared to thus indicate that the values in the private cache are committed values. Although shown at this high level in the embodiment of FIGS. 4 and 5, understand the scope of the present invention is not limited in this regard.

Figure 6:
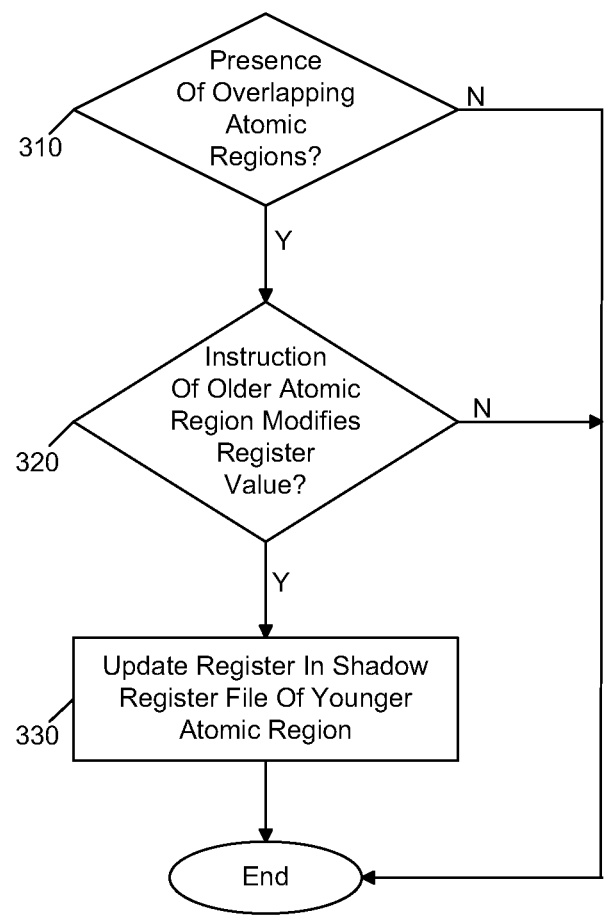
FIG. 6 is a flow diagram of performing a gradual update to a speculative register file of a younger atomic memory region in accordance with one embodiment of the present invention.

Referring now to FIG. 6, shown is a flow diagram of performing a gradual update to a speculative register file of a younger atomic memory region. As seen, method 300 can begin by determining whether overlapping atomic regions are present (diamond 310). This determination can be based on the ARC counter, for example. If multiple atomic regions are present, it can be determined whether an instruction of the older atomic region modifies a register value (diamond 320). This determination can be based, e.g., on comparison of the current LRID value and the LRID of the tagged instruction. If this update to a register value occurs within the older atomic region, control passes to block 330 where the register in the shadow register file of the younger atomic region can be updated to thus provide the ability for gradual register checkpointing.

Figure 7:
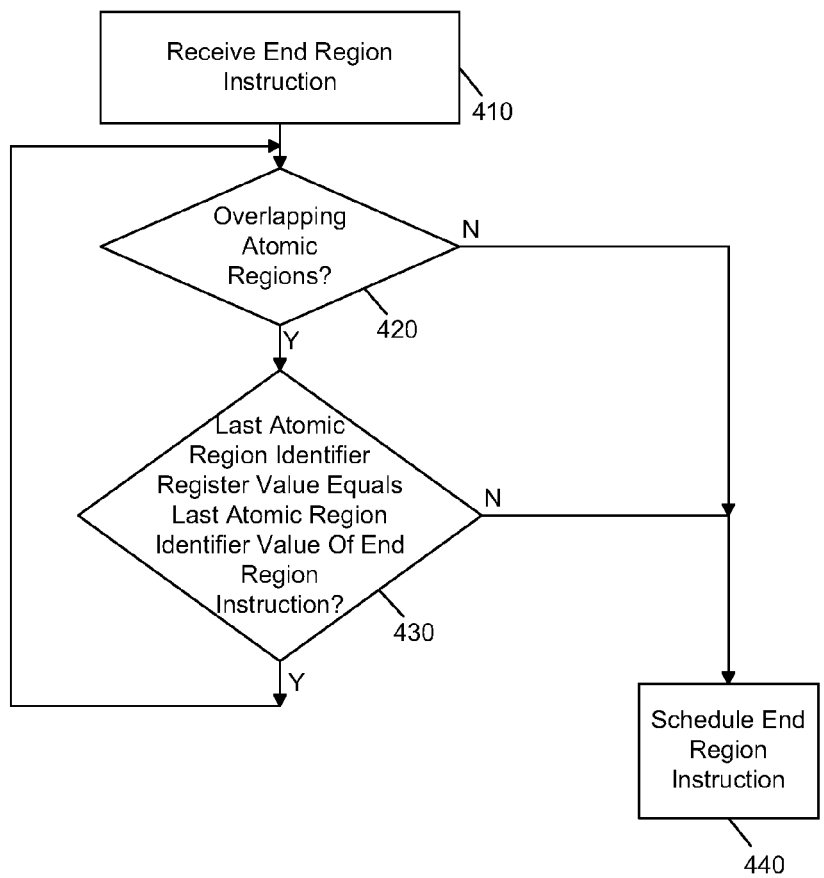
FIG. 7 is a flow diagram of a method for controlling commitment of a younger atomic region in accordance with an embodiment of the present invention.

Referring now to FIG. 7, shown is a flow diagram of a method for controlling commitment of a younger atomic region in accordance with an embodiment of the present invention. As shown in FIG. 7, method 400 may begin by receiving an end region instruction (block 410). Next it can be determined whether overlapping atomic regions are present at diamond 420. This determination may be as above, namely by access to the ARC counter. If multiple regions are present, control passes to diamond 430 where it can be determined whether the LRID value equals the LRID value of the end region instruction. If so, this means that the instruction is of the younger atomic region, but the older atomic region has yet to commit. Accordingly, control passes to back to diamond 420 above. Otherwise if the determination at either of diamonds 420 and 430 is in the negative, control passes to block 440 where the end region instruction can be scheduled to thus enable the concluded atomic region to commit. Although shown with this particular implementation in the embodiment of FIG. 7, understand the scope of the present invention is not limited in this regard.

While implementations of the first type of overlapping atomic regions, OAR-SL, allow both loads and stores from two atomic regions to be reordered over the region boundary, this is an overkill for a relaxed memory model that orders stores totally such as the TSO model and the x86 memory model since a store of the younger atomic region cannot be executed ahead of any store of the older atomic region. Moreover, if the compiler can move up the loads of an atomic region towards the beginning of the atomic region to increase the instruction distance between the loads and the instructions consuming the loaded values, most of the benefits from overlapping two atomic regions can be obtained just by enabling only the loads of the younger atomic region to be overlapped with the older atomic region.

Figure 8:
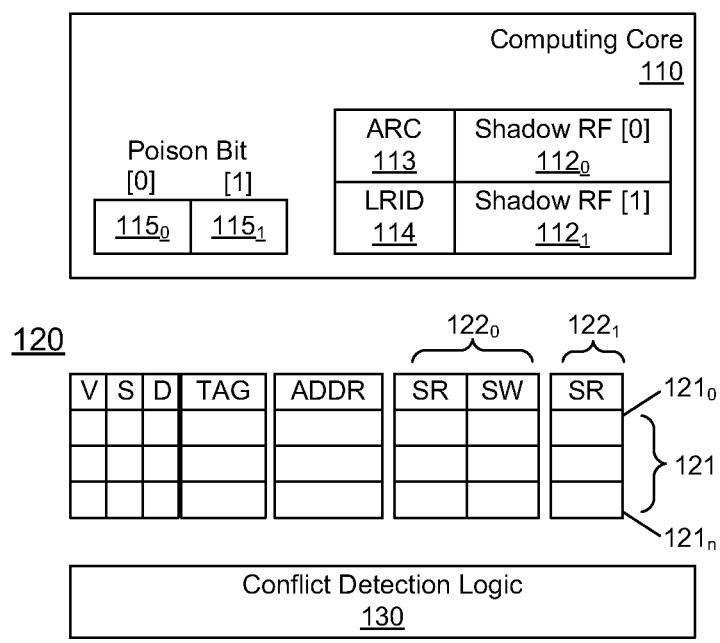
FIG. 8 is a block diagram of a processor in accordance with another embodiment of the present invention.

Leveraging these observations, a processor in accordance with the second type of overlapping atomic region, namely a OAR-L type, can be of a simplified hardware design, as shown in FIG. 8. As seen, this processor 100' may be configured the same as that of FIG. 3, however there is only a single speculative write bit associated with the older atomic region. Thus as seen in FIG. 8 the state indicators associated with each cache line may include a SR bit per atomic region per cache line, but only a SW bit for the older atomic region since the stores of the younger atomic regions are not scheduled for execution until the older atomic region commits. To ensure correct scheduling, a store checks ARC register 113 at an issue state and is considered ready to execute only when this register value is one (namely the older atomic region has committed). Since there can be up to two data versions of the same memory location (i.e., the last committed version and the speculative version for the older atomic region), the additional cache logic of the OAR-SL design to clone a cache line for another speculative version and match the line with an address tag and the SR/SW bits may be avoided for OAR-L. Thus as seen, an embodiment implementing an OAR-L type of overlapping atomic regions may have simpler combinational logic and less bit storages than OAR-SL, and is a good fit for a relaxed memory model that orders stores totally. Accordingly, by including only SR bits (without adding the SW bits except for the older atomic region) per cache line, most of the performance benefits can be realized by only hiding most critical load miss penalties.

While out-of-order processors can leverage the increased memory ordering flexibility from OARs, in-order processors issue instructions in program order and might not be able to take advantage of OARs. To allow software scheduling to leverage OARs, a region ID bit, a single bit, can be added to instructions that have memory operations as part of their semantics (e.g., explicit memory instructions, ALU instructions with memory operands, etc.). This bit is also added to the begin_region instruction. In various embodiments, this bit may be set to zero if software scheduling is not performed beyond region boundary. As used herein, the term region boundary is a logical delimiter between atomic regions. An instruction of a second atomic region is said to be scheduled beyond its region boundary if it is scheduled prior to scheduling of an end region instruction of the first atomic region. When the compiler schedules an instruction beyond the region boundary, the region ID bit of the instruction is set to one, as shown in FIG. 9, which is an illustration of original code (a) and the same code (b) after software scheduling in accordance with an embodiment of the present invention. As seen, instead of tagging the instruction with the LRID register when it is issued, the exclusive-OR value of the LRID register and the region ID bit is tagged. This enables the instruction to be executed as part of the next atomic region. This region bit is thus used by the compiler to schedule instructions beyond a region boundary. Note that this bit is used only for instructions scheduled beyond a region boundary.

Figure 10:
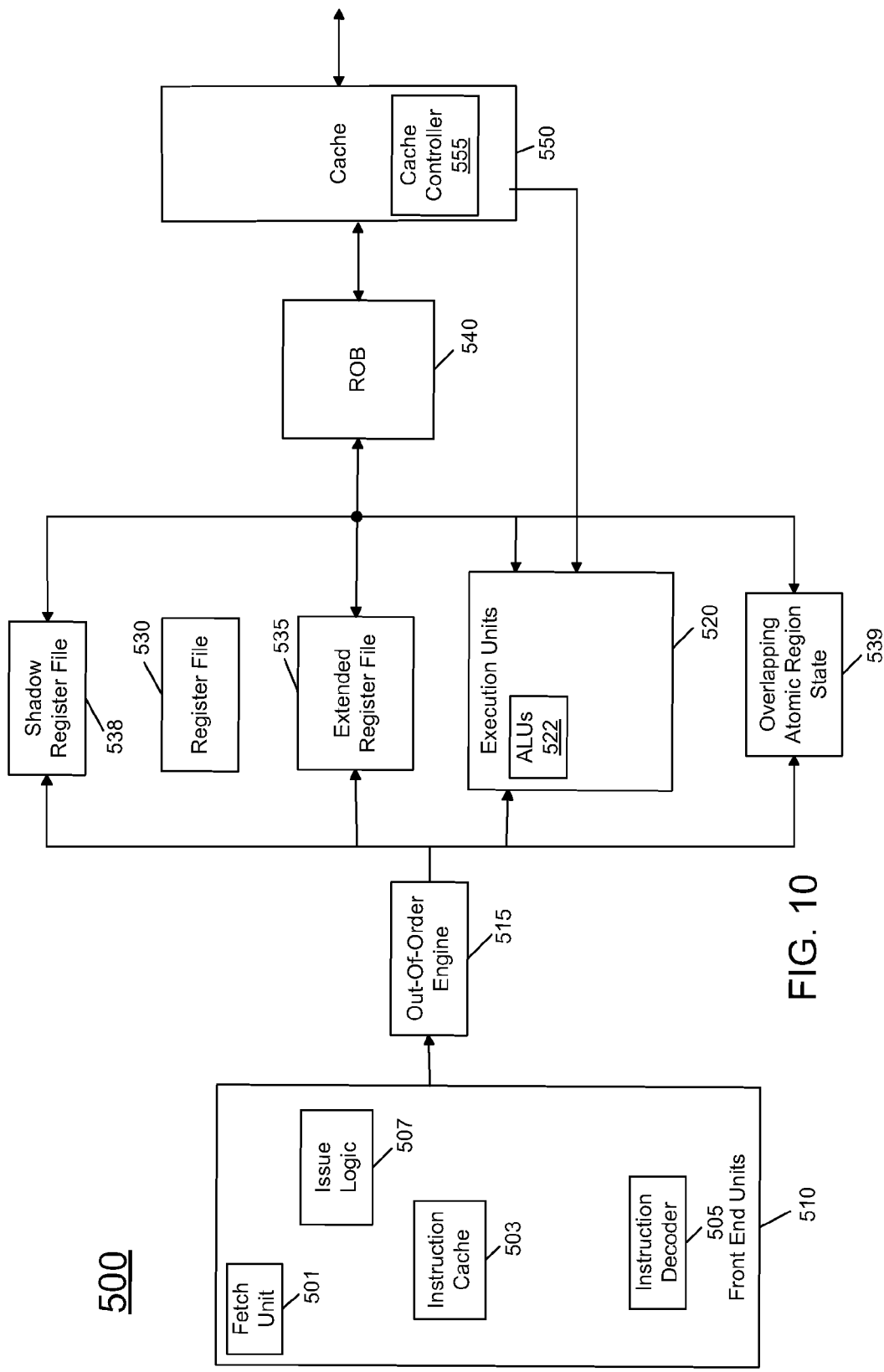
FIG. 10 is a block diagram of a processor core in accordance with one embodiment of the present invention.

Referring now to FIG. 10, shown is a block diagram of a processor core in accordance with one embodiment of the present invention. As shown in FIG. 10, processor core 500 may be a multi-stage pipelined out-of-order processor, and may operate at different voltages and frequencies (both in and out of turbo mode). As seen in FIG. 10, core 500 includes front end units 510, which may be used to fetch instructions to be executed and prepare them for use later in the processor. For example, front end units 510 may include a fetch unit 501, an instruction cache 503, an instruction decoder 505 and issue logic 507. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor. In turn, issue logic 507 may schedule and issue instructions. In various embodiments, issue logic 507 may include logic to append LRID bits to instructions, and to determine whether it is allowable to issue instructions, such as an end region instruction of a younger atomic region.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register. As further seen, shadow register files 538 may be provided each to store a checkpoint of the register values at the beginning of an atomic region. Also, overlapping atomic region state storage 539 can be used to store the various state such as ARC value, LRID, poison indicators and so forth.

Various resources may be present in execution units 520, including, for example, various integer, floating point, and single instruction multiple data (SIMD) logic units, among other specialized hardware. For example, such execution units may include one or more arithmetic logic units (ALUs) 522, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 10, ROB 540 is coupled to a cache 550 which, in one embodiment may be a low level cache (e.g., an L1 cache) although the scope of the present invention is not limited in this regard. Cache 550 may be a private cache that can be used as a speculative buffer as described herein. As further seen, cache 550 can include (or be associated with) a cache controller 555 which can perform conflict detection in accordance with an embodiment of the present invention. Also, execution units 520 can be directly coupled to cache 550. From cache 550, data communication may occur with higher level caches, system memory and so forth. While shown with this high level in the embodiment of FIG. 10, understand the scope of the present invention is not limited in this regard. For example, while the implementation of FIG. 10 is with regard to an out-of-order machine such as of a so-called x86 ISA, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 11:
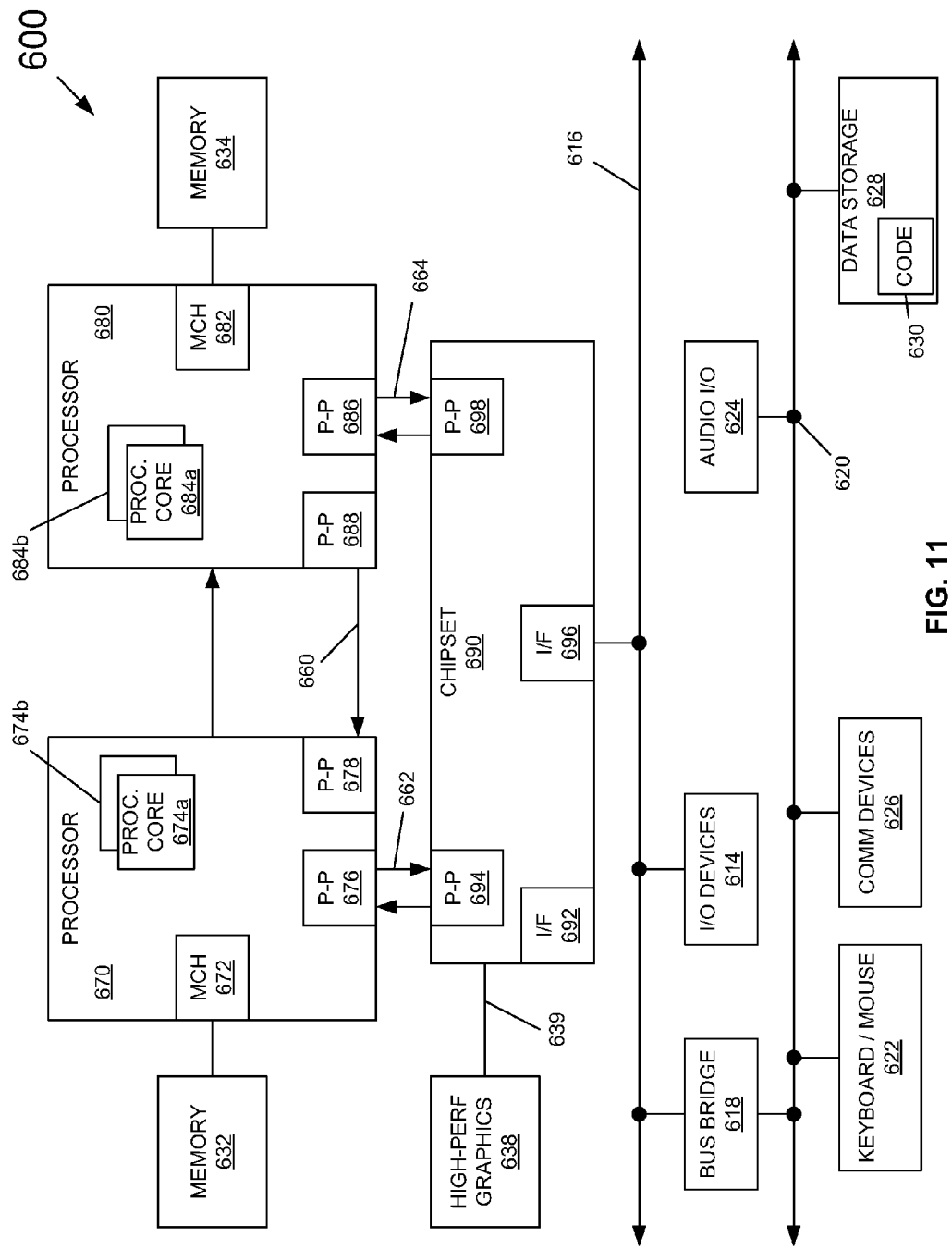
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 600 is a point-to-point interconnect system, and includes a first processor 670 and a second processor 680 coupled via a point-to-point interconnect 650. As shown in FIG. 11, each of processors 670 and 680 may be multicore processors, including first and second processor cores (i.e., processor cores 674a and 674b and processor cores 684a and 684b), although potentially many more cores may be present in the processors. Each of the processors can include various hardware and/or logic to enable overlapping of atomic regions, as described herein.

Still referring to FIG. 11, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 11, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 11, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 11, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core to execute instructions, the core including:
      a register file having a plurality of registers to store data for use in execution of the instructions;
      a first shadow register file to store a first register checkpoint on initiation of a first atomic region;
      a second shadow register file to store a second register checkpoint on initiation of a second atomic region, the second atomic region at least partially overlapping with the first atomic region; and
      logic to update a register of the second shadow register file when a corresponding register of the register file is modified during execution of the first atomic region.

2. The processor of claim 1, further comprising a region identification storage to store a region identifier of a currently executing atomic region.

3. The processor of claim 2, wherein the core includes an issue logic to issue the instructions for execution, the issue logic to insert the region identifier onto the instructions.

4. The processor of claim 1, wherein the processor further comprises a cache memory including a plurality of entries each having a first speculative write indicator to indicate whether data of the entry was written during the first atomic region, and a first speculative read indicator to indicate whether data of the entry was read during the first atomic region.

5. The processor of claim 4, wherein the plurality of entries each further includes a second speculative write indicator to indicate whether data of the entry was written during the second atomic region, and a second speculative read indicator to indicate whether data of the entry was read during the second atomic region.

6. The processor of claim 4, wherein the cache memory is to send a dirty cache line to a memory hierarchy before modification of the dirty cache line by the first atomic region.

7. The processor of claim 6, wherein the cache memory is to copy the modified dirty cache line responsive to a first memory access to the modified dirty cache line by an instruction of the second atomic region.

8. The processor of claim 1, further comprising a poison storage to store an indication of whether the first or second atomic region is to be aborted at commitment.

9. The processor of claim 8, wherein the logic is to set the indicator of the poison storage associated with the second atomic region when a conflict is detected.

10. The processor of claim 9, wherein the core further comprises a retirement unit, wherein the retirement unit is to abort the second atomic region at commitment when the indicator of the poison storage associated with the second atomic region is set.

11. The processor of claim 1, wherein the logic is to prevent the second atomic region from being committed until the first atomic region has been committed.

12. The processor of claim 1, wherein the core is to speculatively write to a cache line speculatively written by the first atomic region without conflict.

13. A method comprising:
   beginning execution of a first atomic region of a thread within a processor;
   beginning execution of a second atomic region of the thread within the processor prior to termination of execution of the first atomic region;
   determining whether a conflict occurs during execution of the second atomic region, and if so, setting a poison indicator associated with the second atomic region to indicate that the second atomic region is doomed to fail and continuing execution of the second atomic region; and
   aborting the second atomic region responsive to the set poison indicator and an end region instruction of the second atomic region.

14. The method of claim 13, further comprising determining whether a conflict occurs during execution of the first atomic region and if so, aborting the first and second atomic regions.

15. The method of claim 13, further comprising identifying the first and second atomic regions via a compiler.

16. The method of claim 13, further comprising preventing commitment of the second atomic region until the first atomic region commits.

17. The method of claim 13, further comprising updating a register in a shadow register file associated with the second atomic region when an instruction of the first atomic region modifies a value of a register file of the processor.

18. A system comprising:
   a multicore processor including a plurality of cores, each of the cores including a private cache having a plurality of entries each to store speculative data of at least a first atomic region or a second atomic region overlapping with the first atomic region, and a region identification storage to store a region identifier of a currently executing atomic region, wherein the multicore processor is to reorder at least some instructions of the second atomic region ahead of at least some instructions of the first atomic region, each of the plurality of entries including a first speculative field associated with the first atomic region and a second speculative field associated with the second atomic region, and wherein the multicore processor is to tag an instruction of the second atomic region with a region indicator having a first value when the instruction is to be scheduled before an end region instruction of the first atomic region, the multicore processor including a logic to receive the region identifier from the region identification storage and the instruction of the second atomic region with the region indicator having the first value and to schedule the instruction of the second atomic region before the end region instruction of the first atomic region based on a logical operation between the region indicator and the region identifier.

19. The system of claim 18, wherein the multicore processor is to order store operations, and the first speculative field includes a first speculative write indicator to indicate whether data of the corresponding entry was written during the first atomic region and a first speculative read indicator to indicate whether data of the entry was read during the first atomic region.

20. The system of claim 19, wherein the second speculative field includes a speculative read indicator to indicate whether data of the entry was read during the second atomic region.

* * * * *